(12) United States Patent
Ikegami

(10) Patent No.: US 8,924,871 B2
(45) Date of Patent: Dec. 30, 2014

(54) GUI EVALUATION SYSTEM, GUI EVALUATION METHOD, AND GUI EVALUATION PROGRAM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 13/120,161

(22) PCT Filed: Aug. 7, 2009

(86) PCT No.: PCT/JP2009/003829
§ 371 (c)(1),
(2), (4) Date: Mar. 22, 2011

(87) PCT Pub. No.: WO2010/035391
PCT Pub. Date: Apr. 1, 2010

(65) Prior Publication Data
US 2011/0173552 A1 Jul. 14, 2011

(30) Foreign Application Priority Data
Sep. 29, 2008 (JP) .................................. 2008-251811

(51) Int. Cl.
*G06F 3/048* (2013.01)
*G06F 11/36* (2006.01)
*G06F 9/44* (2006.01)

(52) U.S. Cl.
CPC .............. *G06F 11/3692* (2013.01); *G06F 8/38* (2013.01); *G06F 9/4443* (2013.01)
USPC ...................................................... 715/764

(58) Field of Classification Search
CPC ............................. G06F 3/0481; G06F 9/4443
USPC ................... 382/100; 715/233, 700, 762, 764
See application file for complete search history.

(56) References Cited

U.S. PATENT DOCUMENTS

| | | | | |
|---|---|---|---|---|
| 5,353,401 A | * | 10/1994 | Iizawa et al. | 715/763 |
| 5,495,567 A | * | 2/1996 | Iizawa et al. | 715/762 |
| 2004/0145607 A1 | * | 7/2004 | Alderson | 345/746 |

(Continued)

FOREIGN PATENT DOCUMENTS

| | | |
|---|---|---|
| JP | 08-241191 | 9/1996 |
| JP | 09-231036 | 9/1997 |

(Continued)

OTHER PUBLICATIONS

International Search Report—PCT/JP2009/003829—Oct. 20, 2009.

(Continued)

*Primary Examiner* — Rashawn Tillery
(74) *Attorney, Agent, or Firm* — Young & Thompson

(57) ABSTRACT

A GUI evaluation system includes: a screen information recording section for storing, as screen information, information on text and input/output components as elements on the evaluation target screen; an input/output component group specifying section for specifying a group of elements; and an input/output component layout determining section for evaluating the layout of elements based on the relationship between elements in a group specified by the input/output component group specifying section and the relationship between groups. The input/output component group specifying section specifies, as a small group, a set containing an input component and an element close to the input component as members, and as a medium group, a set containing a small group and another small group or text close to the small group or the other small group and text as members.

21 Claims, 13 Drawing Sheets

(56) References Cited

U.S. PATENT DOCUMENTS

2008/0059877 A1* 3/2008 Brookler et al. ............. 715/264
2009/0049427 A1* 2/2009 Zhao ........................... 717/127
2009/0273597 A1* 11/2009 Chatamballi et al. ......... 345/418

FOREIGN PATENT DOCUMENTS

| JP | 2004-110267 | 4/2004 |
|---|---|---|
| JP | 2004-234402 | 8/2004 |
| JP | 2004-355157 | 12/2004 |

OTHER PUBLICATIONS

Hidehiko Okada et al.—"GUI Sekkei no Ikkansei o Hyoka suru Tool 'GUI Tester II' no Teian", IPSJ SIG Notes, Jul. 12, 1997, vol. 97, No. 63, pp. 7 to 12, p. 10, left column, lines 1 to 12.

* cited by examiner

FIG. 2

| ITEM NO. | TYPE | DATA | COORDINATES (X1, Y1) - (X2, Y2) |
|---|---|---|---|
| 01 | TEXT | ■HEADLINE A1 | (5, 25) - (70, 32) |
| 02 | TEXT | ITEM A1: | (10, 50) - (50, 57) |
| 03 | LIST BOX | - | (55, 50) - (140, 57) |
| 04 | TEXT | ITEM A2: | (10, 60) - (50, 67) |
| 05 | TEXT BOX | - | (55, 60) - (110, 67) |
| 06 | TEXT | ITEM A3: | (10, 100) - (50, 107) |
| 07 | RADIO BUTTON | - | (55, 100) - (57, 107) |
| 08 | TEXT | ITEM A3-1: | (60, 100) - (110, 107) |
| ⋮ | ⋮ | ⋮ | ⋮ |

FIG. 3

WINDOW A

■ HEADLINE A1

ITEM A1: [ ▼ ]

ITEM A2: [           ]

ITEM A3: ⊙ITEM A3-1 (31)   ○ITEM A3-2 (32)

33 — ITEM A4: [  ]:[  ] ~ [  ]:[  ]

ITEM A5-1: [          ]

ITEM A5-2: [     ]

[ OK ] [ CANCEL ]

FIG. 7

| SCREEN NAME | PRESENCE OR ABSENCE OF ITEM | INTERVAL OF INPUT/ OUTPUT COMPONENTS | ALIGNMENT OF INPUT/ OUTPUT COMPONENTS |
|---|---|---|---|
| WINDOW A | ◯:NO PROBLEM | ◯:NO PROBLEM | ×:PROBLEM<br>- ITEM A3, ITEM A4, ITEM A5-1, ITEM A5-2 |

FIG. 12

| SCREEN NAME | PRESENCE OR ABSENCE OF ITEM | INTERVAL OF INPUT/ OUTPUT COMPONENTS | ALIGNMENT OF INPUT/ OUTPUT COMPONENTS |
|---|---|---|---|
| WINDOW B | x:PROBLEM<br>- LIST BOX (ITEM 02) | x:PROBLEM<br>- ITEM B2, TEXT BOX (ITEM 04)<br>- RADIO BUTTON (ITEM 6), ITEM B3-1, RADIO BUTTON (ITEM 8), ITEM B3-2 | ○:NO PROBLEM |

FIG. 16

| SCREEN NAME | PRESENCE OR ABSENCE OF ITEM | INTERVAL OF INPUT/ OUTPUT COMPONENTS | ALIGNMENT OF INPUT/ OUTPUT COMPONENTS |
|---|---|---|---|
| WINDOW C | ○:NO PROBLEM | x:PROBLEM<br>-ITEM C5, TEXT BOX (ITEM 10) | x:PROBLEM<br>-CHECK BOX (ITEM 12),<br>CHECK BOX (ITEM 23),<br>CHECK BOX (ITEM 28) | ically to a GUI evaluation system, a GUI evaluation method and a GUI evaluation program for evaluating system usability, and particularly to a GUI evaluation system, a GUI evaluation method and a GUI evaluation program for evaluating the appropriateness of the layout of input/output components and item names.

GUI EVALUATION SYSTEM, GUI EVALUATION METHOD, AND GUI EVALUATION PROGRAM

TECHNICAL FIELD

The present invention relates to a GUI evaluation system, a GUI evaluation method and a GUI evaluation program for evaluating system usability, and particularly to a GUI evaluation system, a GUI evaluation method and a GUI evaluation program for evaluating the appropriateness of the layout of input/output components and item names.

BACKGROUND ART

A GUI (graphical user interface) is widely used as an interface used when a user inputs and outputs information into and from a computer system (hereinafter called a system). The GUI may be evaluated to evaluate system usability. An example of evaluating the GUI is to evaluate the appropriateness of the layout of input/output components and item names. For example, it is evaluated whether there is any portion to impair visibility in the layout of elements, such as item names and information input/output areas, on each screen provided in an evaluation target system the usability of which is to be evaluated.

When such an evaluation is conducted, it is required to check a group, in which several elements are put together, for the presence or absence of a problem, rather than to evaluate the position of each individual element, in view of such a characteristic that adjacent elements or similar elements are perceived as a block (the law of pragnanz in Gestalt psychology).

There are known a GUI automatic evaluation device for automatically evaluating a GUI and a test conducting device (for example, see Patent Documents 1 and 2). The GUI automatic evaluation device described in Patent Document 1 inputs a screen designing guide and accumulates guide data as format rules. The device also accumulates, as information on the GUI, attribute information and attribute values for each window in a system to be evaluated. Then, the device checks the information on the GUI against the rules for each window and outputs the checking results. In Patent Document 1, a means for generating the GUI information from the product specifications, a source program, a GUI building tool or the like is also described.

In the testing device described in Patent Document 2, an operation database (DB), a user sequence designated by a user when executing a test and a complementary sequence complemented to execute the user sequence according to a procedure are stored. Then, when executing the user sequence according to the user sequence execution procedure, the device checks for the state of the GUI part. When the user sequence cannot be executed, the operation DB is searched for an appropriate supplementary sequence so that the user sequence will be executed after the supplementary sequence is executed. The test conducting device described in Patent Document 2 can conduct a test for automatically performing a predetermined operational procedure.

A web screen creating tool, which is capable of checking for the appropriateness of a term on a web screen, is described in Patent Document 3. The web screen creating tool checks a source file of the web screen for homonyms, declensional Kana endings and synonyms of terms pre-registered as being likely to be misspelled. Specifically, when a registered term is detected on the web screen to be evaluated, alternatives to the term are displayed as a list.

CITATION LIST

Patent Literature

Patent Document 1 Japanese Patent Application Publication No. 8-241191
Patent Document 2 Japanese Patent Application Publication No. 2004-110267
Patent Document 3 Japanese Patent Application Publication No. 2004-234402

SUMMARY OF INVENTION

Technical Problem

When the GUI automatic evaluation device described in Patent Document 1 is employed, if the specifications or source program of a system to be evaluated cannot be acquired because the system is still in prototype stage or it is another company product, the evaluator will be required to write information on the GUI manually. If the work is done manually, the information on the GUI may not be created correctly. Even if the specifications are available, the specifications may include errors. In other words, correct evaluation may not be made unless an actually operating system to be evaluated is evaluated.

When the test conducting device described in Patent Document 2 is employed, it can be checked whether a predetermined user sequence can be executed normally, but it takes time to prepare for the sequence in response to the system to be evaluated. In addition, the GUI part in which the sequence is executed or the sequence itself cannot be evaluated.

The web screen creation tool described in Patent Document 3 cannot evaluate the usability characteristics of terms other than unregistered ones.

Upon evaluating the appropriateness of the layout of input/output components (text box, list box, radio button, etc.) and items indicative of the content of the components on an evaluation target screen, if processing for checking a group, in which several input/output components are put together, for the presence or absence of a problem is performed manually, since the workload of an evaluator will increase and hence this will make a check omission more likely, the results may vary from evaluator to evaluator. When a bunch of elements, rather than the positions of individual elements that form the evaluation target screen, is checked as to whether there is a problem with the layout, since portions to be checked vary depending on the type of element or the way to group the elements, the evaluator is required to have more than a certain level of knowledge. If the evaluator does not have much experience, the evaluator may overlook a problem or regard a problem-free portion as a problem during evaluation. It is also required to do evaluation work on all screens to be evaluated.

In Patent Documents 1 and 2 mentioned above, the devices for automatically evaluating a GUI are described, but these devices do not allow for evaluation of the appropriateness of the layout of input/output components and items indicative of the content of the components on an evaluation target screen.

Therefore, it is an object of the present invention to provide a GUI evaluation system, a GUI evaluation method and a GUI evaluation program capable of evaluating the appropriateness of the layout of input/output components and items indicative of the content of the components on an evaluation target screen.

Solution to Problem

A GUI evaluation system according to the present invention is a GUI evaluation system for evaluating an evaluation target screen included in the evaluation system, comprising: a screen information recording means for storing, as screen information, information on text and input/output components as elements on the evaluation target screen; an input/output component group specifying means for specifying a group of elements, wherein the input/output component group specifying means includes a small group specifying section for referring to the screen information stored in the screen information recording means to specify, as a small group, a set of an input/output component and an element close to the input/output component, and a medium group specifying section for specifying, as a medium group, a small group and another small group or text close to the small group or the other small group and the text; and an input/output component layout determining means for evaluating the layout of elements based on the relationship between elements in a group specified by the input/output component group specifying section and the relationship between groups.

A GUI evaluation method according to the present invention is a GUI evaluation method for evaluating an evaluation target screen included in the evaluation system, comprising the steps of: storing, as screen information in a screen information recording means, information on text and input/output components as elements on the evaluation target screen; specifying a group of elements, wherein upon specifying the group of elements, referring to the screen information stored in the screen information recording means to specify, as a small group, a set of an input/output component and an element close to the input/output component, and specifying, as a medium group, a set of a small group and another small group or text close to the small group or the other small group and the text; and evaluating the layout of elements based on the relationship between elements in a group containing the specified element and the relationship between groups.

A GUI evaluation program according to the present invention, makes a computer in a GUI evaluation system, which evaluates an evaluation target screen included in the evaluation system, perform: screen information storing processing for storing, as screen information in a screen information recording means, information on text and input/output components as elements on the evaluation target screen; input/output component group specifying processing for specifying a group of elements, wherein in the input/output component group specifying processing, the computer is caused to perform small group specifying processing for referring to the screen information stored in the screen information recording means to specify, as a small group, a set of an input/output component and an element close to the input/output component, and medium group specifying processing for specifying, as a medium group, a set of a small group and another small group or text close to the small group or the other small group and the text; and input/output component layout determining processing for evaluating the layout of elements based on the relationship between elements in a group specified in the input/output component group specifying processing and the relationship between groups.

Advantageous Effects of the Invention

According to the present invention, an evaluator can conduct a thorough and consistent evaluation of the appropriateness of the layout of elements on an evaluation target screen such as input/output components and items.

BRIEF DESCRIPTION OF DRAWINGS

FIG. 2 It depicts an explanatory drawing showing an example of GUI information stored in a GUI information recording section.

FIG. 3 It depicts an explanatory drawing showing an example of an evaluation target screen in an evaluation target system.

FIG. 7 It depicts an explanatory drawing showing an example of output of the determination results on window A from an input/output component layout determining section.

FIG. 12 It depicts an explanatory drawing showing an example of output of the determination results on window B from the input/output component layout determining section 5.

FIG. 16 It depicts an explanatory drawing showing an example of output of the determination results on window C from the input/output component layout determining section.

DESCRIPTION OF EMBODIMENTS

A specific exemplary embodiment of the present invention will now be described with reference to the accompanying drawings.

Figure 1:
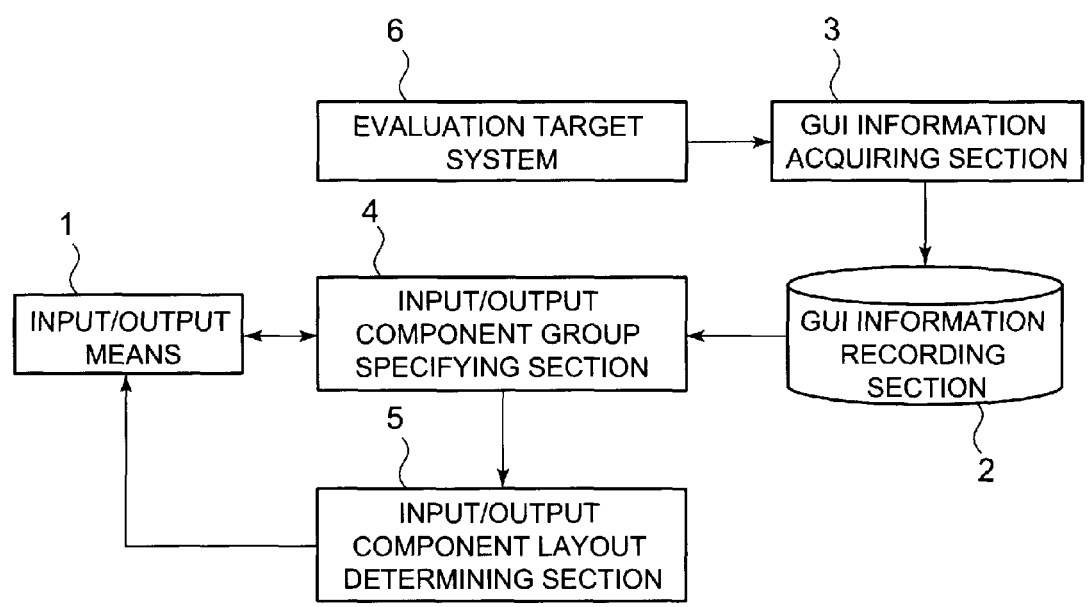
FIG. 1 It depicts a block diagram showing a configuration of a GUI evaluation system according to one preferred exemplary embodiment.

FIG. 1 is a block diagram showing a configuration of a GUI evaluation system according to one preferred exemplary embodiment of a GUI evaluation system according to the present invention. The GUI evaluation system shown in FIG. 1 includes an input/output means 1, a GUI information recording section 2, a GUI information acquiring section 3, an input/output component group specifying section 4 and an input/output component layout determining section 5.

The input/output means 1 includes an input means, such as a mouse and a keyboard, for entering information indicative of the content of operations performed by an evaluator, and an output means such as a display.

The GUI information recording section 2 stores GUI information (screen information on text and input/output components) including information indicative of the coordinates of text and input/output components (text box, combo box, list box, check box, radio button) and types of components as elements on an evaluation target screen, and the content of text. The input/output components include selection components such as a check box and a radio button and text input/output components relating to text such as a text box, a list box and a combo box (i.e., sections to urge a user enter text and to display the text). In the following description, the check box and the radio button are illustrated as the selection components, but any other types of components may be used. Likewise, the text box, the list box and the combo box are illustrated as the text input/output components, but any other forms are available for the text input/output component.

The GUI information acquiring section 3 acquires beforehand information indicative of the coordinates of text and input/output components and the types of components as elements on a screen to be evaluated among multiple screens displayed by an evaluation target system 6 and the content of text, and records them as GUI information in the GUI information recording section 2. The GUI information recorded in the GUI information recording section 2 may also be registered with the GUI information recording section 2 from a storage medium storing the GUI information already generated, rather than being acquired from the evaluation target system 6.

The text box is the display of a shape such as a rectangle displayed on the screen, i.e., a component having an area to urge the user to enter text. The combo box is a component that presents options to the user and allows the user to enter any data other than the presented options. The list box is a component for presenting options selectable by the user in the form of a list. The check box is a component having multiple selection items and areas into each of which a check mark or the like is entered to indicate that it is selected. The radio button is a component having a selection portion to urge the user to select one from two or more selection items.

The input/output component group specifying section 4 refers to the GUI information stored in the GUI information recording section 2, and first checks the check box and the radio button as to whether text exists within a specified distance in the right direction of each component. When text exists, the text is regarded as a small item. Then, a combination of the check box or the radio button and the small item is set as a small group (input/output component group (small)). Further, the text box, the list box and the combo box are checked as to whether text indicative of a symbol or unit or another input/output component exists within a specified distance in the right direction sequentially from a component located at the upper left of the evaluation target screen. When any text or another input/output component exists, the text or the other input/output component is regarded as an element belonging to the same group of the text input/output component concerned. Then, the same processing is performed on the rightmost element in the same group. The processing is repeated until text and another input/output component no longer exist within the specified distance in the right direction, and a set of elements finally put together is specified as an input/output component group (small).

Further, the input/output component group specifying section 4 checks whether there is text that does not belong to the other medium groups (input/output component group (medium)) within a specified distance in the upward or left direction of the input/output component group (small). When text exists, the text is regarded as an item. Then, a combination of the item and the input/output component group (small) is set as an input/output component group (medium). Further, the input/output component group (small) including the check box or the radio button is checked as to whether any input/output component group (small) that does not belong to the other input/output component groups (medium) including the same type of input/output component exists within a specified distance in the right and downward directions. When an input/output component group (small) exists, the input/output component group (small) is regarded as an element belonging to the same group as the input/output component group (small) including the check box or the radio button. Then, the same processing is performed on the rightmost and lowermost element in the same group. The processing is repeated until no element exists any longer within the specified distance in the right and downward directions, and a set of elements finally put together is set as an input/output component group (medium).

Further, the input/output component group specifying section 4 checks whether another input/output component group (medium) in which the coordinates of left edges match with each other exists within the specified distance in the downward direction sequentially from an input/output component group (medium) at the upper left of the screen. When another input/output component group (medium) exists, the other input/output component group (medium) is regarded as an element belonging to the same group. Then, the same processing is performed on the lowermost element in the group. The processing is repeated until no element exists any longer within the specified distance in the downward direction, and a set of elements finally put together is set as an input/output component group (large). After that, information on all the input/output component groups is output to the input/output component layout determining section 5.

The input/output component layout determining section 5 refers to the input/output component group information input from the input/output component group specifying section 4 to determine that there is a problem with the presence or absence of an item when there exists an input/output component group (small) including no small item corresponding to the check box or the radio button or an input/output component group (medium) including no item. For example, the item or the small item is text indicative of the content of the input/output component.

Further, the input/output component layout determining section 5 excludes an input/output component group (medium), in which components are arranged in the downward direction of the item, among the input/output component groups (medium) belonging to the same input/output component group (large) to check for a portion closest to the item among components adjacent in the right direction. If the distance to the portion closest to the item does not fall within the specified range so that the distance will become too close or too far away, it is determined that there is a problem with the distance between the item and the input/output component. It also checks whether the X coordinates of input/output components adjacent in the right direction of respective items are different. When there is portions where the X coordinates are different, it is determined that there is a problem with the alignment of the input/output components.

If another element exists in the left direction of an input/output component group (large), the input/output component layout determining section 5 checks for the position of an element closest to the input/output component group (large). If the distance to the position closest to the input/output component group (large) does not fall within the specified range so that the distance will become too close, it is determined that there is a problem with the distance between the item and the input/output component. In regard to input/output component groups (medium) that do not belong to any input/output component group (large), it is checked for a distance between an item and an input/output component arranged in the right direction. If the distance to the input/output component does not fall within the specified range so that the distance will become too close, it is determined that there is a problem with the distance between the item and the input/output component.

Further, in regard to input/output component groups (medium) in which components are arranged in the downward direction of respective items, the input/output component layout determining section 5 checks for a distance between an item and an input/output component arranged in the downward direction of the item. If the distance between the item and the input/output component does not fall within the specified range so that the distance will become too close, it is determined that there is a problem with the distance between the item and the input/output component.

Further, the input/output component layout determining section 5 checks for a distance between a small item and a component in each input/output component group (small) in an input/output component group (medium) including the check box or the radio button. If the distance between the small item and the component does not fall within the specified range so that the distance will become too close or too far away, it is determined that there is a problem with the distance between the small item and the component (check box or radio button). When the check box or the radio button is arranged in the lateral direction, if the distance between the small item and a component in a left-hand input/output component group (small) is distance A and the distance between the right edge of the left-hand input/output component group (small) and a right-hand input/output component group (small) is distance B, distance A and distance B are compared on all the input/output component groups (small). If distance B is equal to or less than distance A, it is determined that there is a problem with the layout of the check box or the radio button and the determination result is output to the input/output means 1.

For example, the input/output component group specifying section 4 and the input/output component layout determining section 5 are implemented by a CPU operating according to a program on a computer that realizes the GUI evaluation system.

FIG. 2 is an explanatory drawing showing an example of GUI information stored in the GUI information recording section 2. FIG. 3 is an explanatory drawing showing an example of an evaluation target screen in an evaluation target system. In the example shown in FIG. 2, the GUI information includes item numbers, the kinds of input/output information or the types of input/output components (text, text box, list box, combo box, radio button, check box), data (the content of text) and the coordinates. In FIG. 2, GUI information on window A shown in FIG. 3 is illustrated. In the GUI information, the item numbers are set as serial numbers, setting the type, data and coordinates in order from an element (text or an input/output component) located at the upper left of window A.

Referring next to explanatory drawings of FIG. 3 to FIG. 7, processing performed by the input/output component group specifying section 4 and the input/output component layout determining section 5 to specify an input/output component group of an evaluation target screen in an evaluation target system 8 and determine the appropriateness of the layout of input/output components, i.e., processing for evaluating the appropriateness of the layout of input/output components will be described. Here, a case is taken as an example in which window A shown in FIG. 3 is the evaluation target screen.

Figure 4:
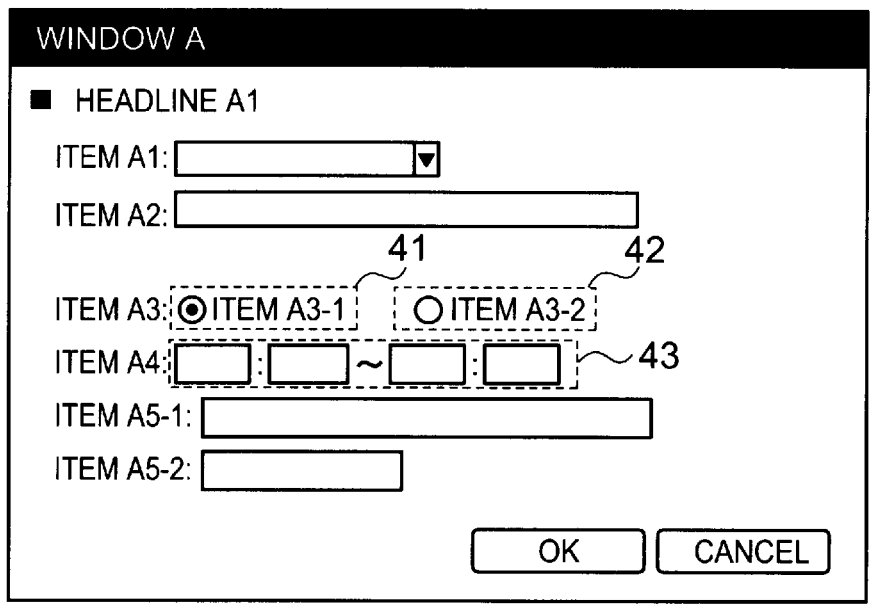
FIG. 4 It depicts an explanatory drawing showing the specification results of input/output component groups (small).

The input/output component group specifying section 4 targets window A shown in FIG. 3 to check for the existence of text within a specified distance in the right direction of a radio button 31. Since the existing text is "item A3-1," the input/output component group specifying section 4 regards the text "item A3-1" as a small item for the radio button 31. As shown in FIG. 4, a combination of the radio button 31 and the text "item A3-1" is set as an input/output component group (small) 41. Similarly, a combination of a radio button 32 and text "item A3-2" is set as an input/output component group (small) 42. FIG. 4 is an explanatory drawing showing the specification results of the input/output component groups (small). In the exemplary embodiment, the "specified distance" at the time of searching for a small item of a check box or a radio button is set to be unlimited, so that when text exists without any other input/output component in the left direction on the same screen, the text is regarded as a small item. However, the "specified distance" may be set to a specific numeric value such as ten pixels or less, or it may be set such as twice the size (height) of the text.

The input/output component group specifying section 4 also checks whether there exists text indicative of a symbol or unit, or another input/output component within the specified distance in the right direction from each text box, list box or combo box. If the text indicative of a symbol or unit, or the other input/output component exists, the existing one is regarded as an element belonging to the same group as the text box, list box or combo box. Further, the same processing is performed on the rightmost element in the same group, and the same processing is repeated until any text indicative of a symbol or unit and any other input/output component no longer exist within the specified distance in the right direction to specify the input/output component group (small). In window A shown in FIG. 3, since text ":" indicative of a symbol exists within the specified distance in the right direction of a text box 33, it is regarded as an element belonging to the same group.

Then, the same processing is performed using text ":" as the starting point to regard, as the same group, text boxes, text "~" and the like further arranged in the right direction. Finally, the input/output component group specifying section 4 specifies an input/output component group (small) 43 as shown in FIG. 4. In the exemplary embodiment, ":" and "~," "year," "month," "day," "hour" and "minute" are assumed as text indicative of a symbol or unit, but the number of characters that form the text may be increased. Further, in the exemplary embodiment, the "specified distance" used to specify the input/output component group (small) of text boxes, the list box and the combo box is set to five pixels. However, it may be set to another numeric value or ½ the size (height) of the text.

Next, the input/output component group specifying section 4 checks whether there exists text within the specified distance in the upward or left direction of the input/output component group (small) or within the specified distance in the upward or left direction of an input/output component that does not belong to the input/output component group (small). If text exists, the text is regarded as an item for a corresponding input/output component group (small) or the input/output component, and the text and the input/output component group (small) or the input/output component are set to form an input/output component group (medium). If no text exists, the input/output component group (small) or the input/output component that does not belong to the input/output component group (small) is regarded as an input/output component group (small) including no item or an input/output component that neither belongs to the input/output component group (small) nor includes any item, and specified as an input/output component group (medium).

Figure 5:
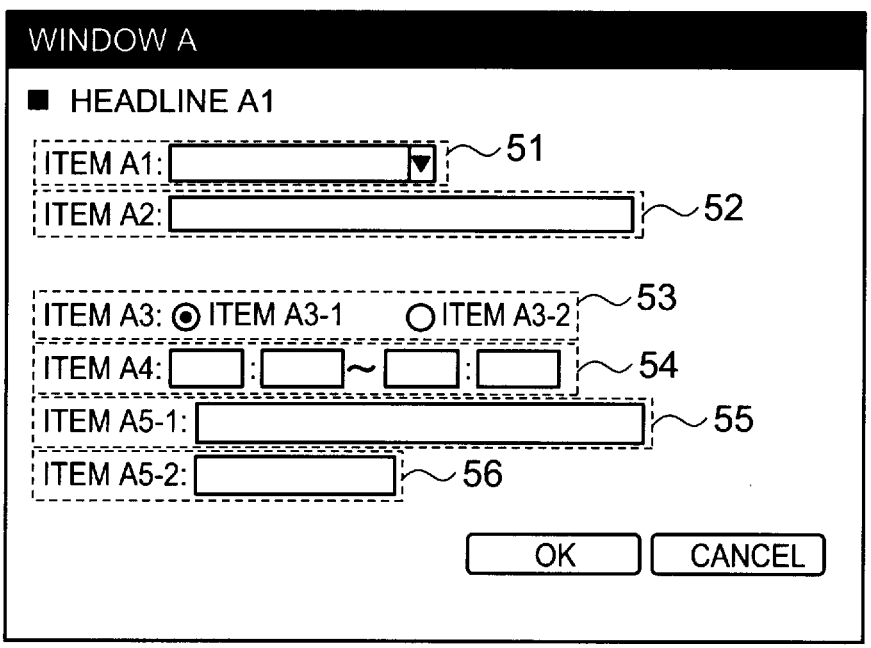
FIG. 5 It depicts an explanatory drawing showing the specification results of input/output component groups (medium).

FIG. 5 is an explanatory drawing showing the specification results of input/output component groups (medium). In the example shown in FIG. 5, the input/output component group specifying section 4 specifies six input/output component groups (medium) 51 to 56 in window A. In the exemplary embodiment, the "specified distance" at the time of searching for an item is set to five pixels in the upward direction and to be unlimited in the left direction. However, for example, a specific numeric value may be set to ten pixels in the left direction, or it may be set such as twice the size (height) of the text in the upward direction and the left direction.

Next, the input/output component group specifying section 4 checks whether there exists another input/output component group (medium) in which the coordinates of left edges match with each other and which exists within the specified distance in the downward direction sequentially from an input/output component group (medium) located at the upper left of the screen. If another input/output component group (medium) exists, the input/output component group (medium) is regarded as an element belonging to the same group. Further, the same processing is repeated until another input/output component group (medium) with respect to the input/output component group (medium) located at the lower end of the same group no longer exists, and finally an input/output component group (large) is specified.

Figure 6:
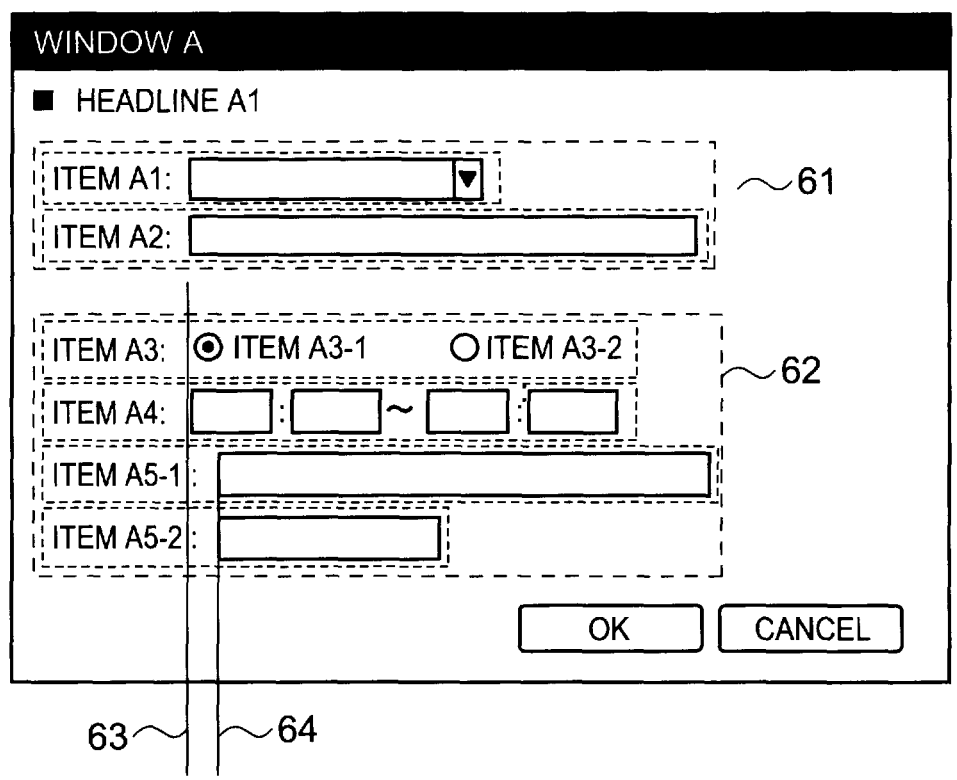
FIG. 6 It depicts an explanatory drawing showing the specification results of input/output component groups (large).

FIG. 6 is an explanatory drawing showing the specification results of input/output component groups (large). In the example shown in FIG. 6, the input/output component group specifying section 4 specifies an input/output component group (large) 61 in which two input/output component groups (medium) 51 and 52 are put together on the screen in window A, and an input/output component group (large) 62 in which four input/output component groups (medium) 53, 54, 55 and 56 are put together on the lower part of the screen. In the exemplary embodiment, the "specified distance" at the time of searching for an input/output component group (medium) is set to ten pixels in the downward direction. However, another numeric value may be set such as within 20 pixels, or it may be set such as twice the size (height) of the text.

Next, the input/output component layout determining section 5 targets all the input/output component groups (medium) and all the input/output component groups (small) to check whether there is a group in which no item or small item exists. If there is a group in which no item or small item exists, it is determined that there is a problem with the presence or absence of an item. In window A illustrated in FIG. 3, since items or small items exist in all the groups, the input/output component layout determining section 5 determines that there is no problem (see FIG. 4 to FIG. 6).

Further, the input/output component layout determining section 5 checks whether in each individual input/output component group (medium) belonging to one input/output component group (large), the X coordinates of left edges of input/output component groups (small) close to respective items or input/output components close to the respective item and not belonging to any input/output component group (small) match with each other, and checks for a distance to one closest to the item. In the example shown in FIG. 3 and FIG. 4 to FIG. 6, the left edges of the input/output component groups (small) 41 and 43 in the input/output component groups (medium) 53 and 54 (see auxiliary line 63 in FIG. 6) and the left edges of the input/output components in the input/output component groups (medium) 55 and 56 (see auxiliary line 64 in FIG. 6) do not match with each other in window A. Therefore, the input/output component layout determining section 5 determines that there is a problem with the alignment of the input/output components.

Further, since the distances between items in all the input/output component groups (medium) and input/output component groups (small) close to the items or input/output components close to the items and not belonging to any input/output component group (small) fall within the specified range in window A, the input/output component layout determining section 5 determines that there is no problem. In the exemplary embodiment, the "specified range" used in determining the distance between an item and an input/output component is set to not less than three pixels and not more than ten pixels. However, any other numeric values may be set, or it may be set such as not less than ½ and not more than twice the height with reference to the size (height) of the text.

FIG. 7 is an explanatory drawing showing an example of output of the determination results on window A from the input/output component layout determining section 5. As shown in FIG. 7, the input/output component layout determining section 5 outputs three kinds of determination results on the presence or absence of an item, the distance between input/output components and the alignment of input/output components. An evaluator can easily grasp the presence or absence of a problem and the problematic portion in window A from the determination results output from the input/output component layout determining section 5.

Thus, elements close to each other are put together in the same group according to the processing methods respectively corresponding to a check box or a radio button as the selection component and a text box, a list box or a combo box as a component relating to text, enabling an evaluation on condition that portions in which the distance and alignment of elements are to be evaluated are specified with certainty.

Here, the case is taken as an example in which the evaluation on a selection component and the evaluation on a component relating to text are both conducted, but either the evaluation on the selection component or the evaluation on the component relating to text may be conducted.

Further, although the input/output component group specifying section 4 specifies small groups, medium groups and large groups on the evaluation target screen, even if the input/output component group specifying section 4 specifies small groups and medium groups without specifying any large group, the appropriateness of the layout and alignment of input/output information can be evaluated. In other words, at least the respective medium groups and the respective small groups are checked as to whether text display is included so that appropriateness related to the presence or absence of an item corresponding to an input/output component can be evaluated. It is also determined whether the distance between text display in a medium group and a small group or an input/output component in a group adjacent to the text display falls within a certain specified range so that the appropriateness of a layout between elements can be evaluated. Further, when the input/output component is a selection component, the distance between the input/output component and text display is compared with the distance between the input/output component and an adjacent input/output component, and if the distance between the input/output component and the text display is equal to or less than the distance between the input/output component and the adjacent input/output component, it can be determined that the layout of the selection component is inappropriate.

Figure 8:
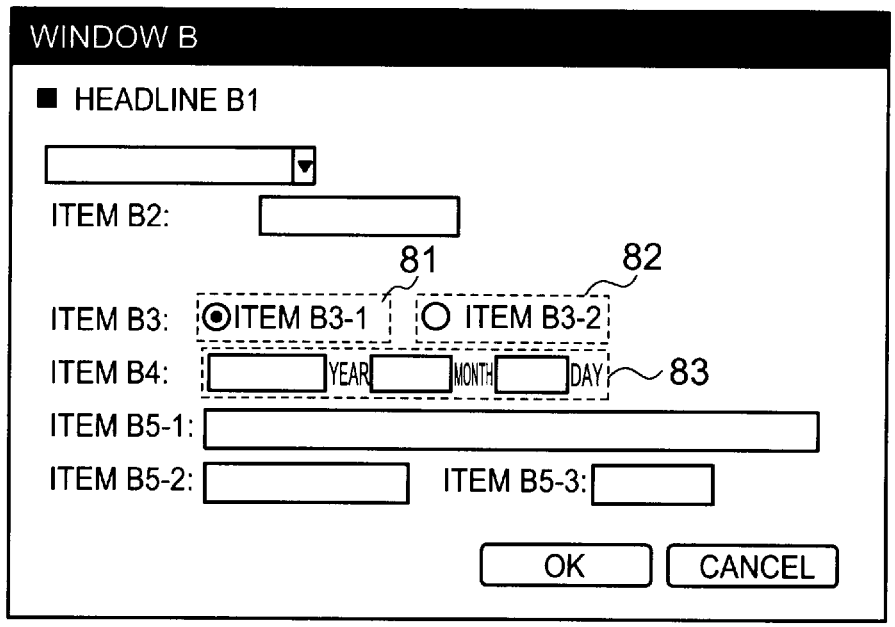
FIG. 8 It depicts an explanatory drawing showing the specification results of input/output component groups (small).

Referring next to explanatory drawings of FIG. 8 to FIG. 12, another example of processing performed by the input/output component group specifying section 4 and the input/output component layout determining section 5 to specify input/output component groups on an evaluation target screen and determine the appropriateness of the layout of input/output information will be described. FIG. 8 is an explanatory drawing showing window B as the evaluation target screen. Here, a case is taken as an example in which window B shown in FIG. 8 and the like is targeted for evaluation.

The input/output component group specifying section 4 performs processing for specifying input/output component groups (small) in the manner already described above. Upon completion of the processing, combinations of radio buttons and text (small items) are specified as shown in FIG. 8 as an input/output component group (small) 81 and an input/output component group (small) 82. Further, a combination including text boxes and text indicative of units ("year," "month," "day") is specified as an input/output component group (small) 83.

Figure 9:
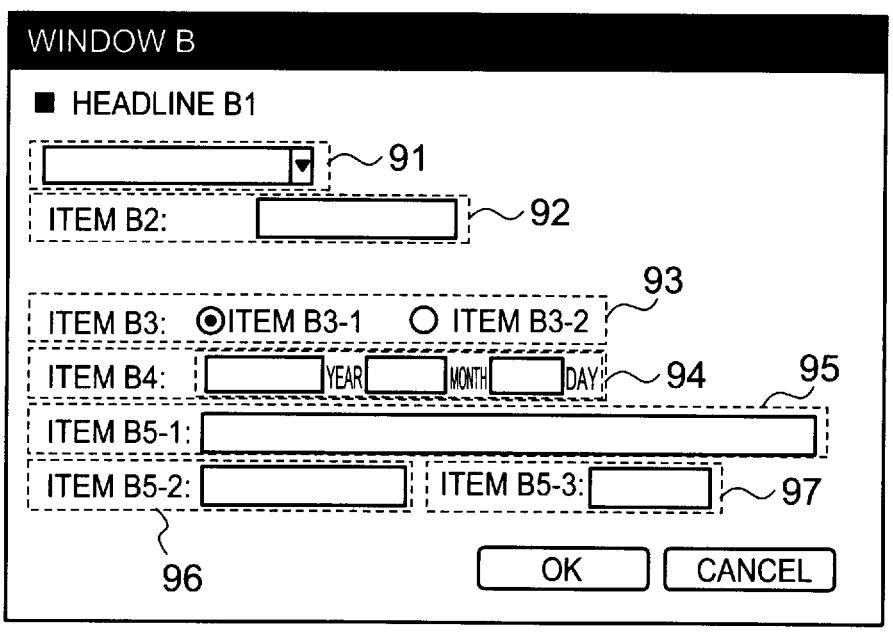
FIG. 9 It depicts an explanatory drawing showing the specification results of input/output component groups (medium).

Next, the input/output component group specifying section 4 performs processing for specifying input/output component groups (medium) in the manner already described above. Upon completion of the processing, input/output component groups (medium) 91 to 97 are specified as shown in FIG. 9. Note that since a list box arranged between text "headline B1" and the input/output component group (medium) 91 does not exist within the specified distance in the upward direction and the left direction, it is specified as the input/output component group (medium) 91 without any item.

Figure 10:
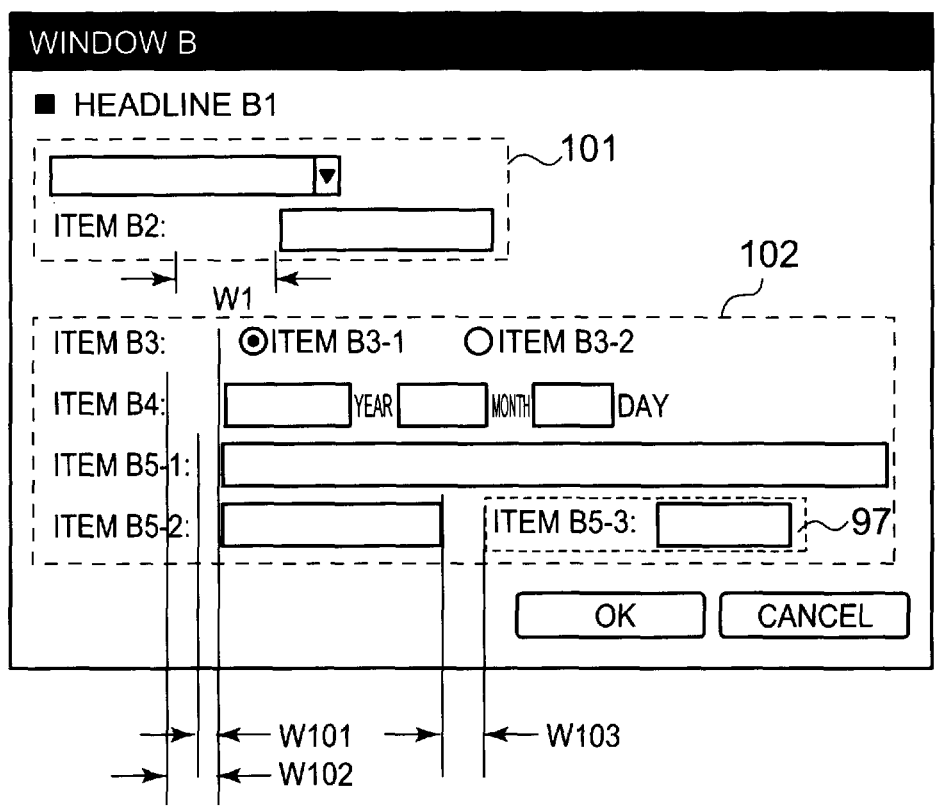
FIG. 10 It depicts an explanatory drawing showing the specification results of input/output component groups (large).
Figure 11:
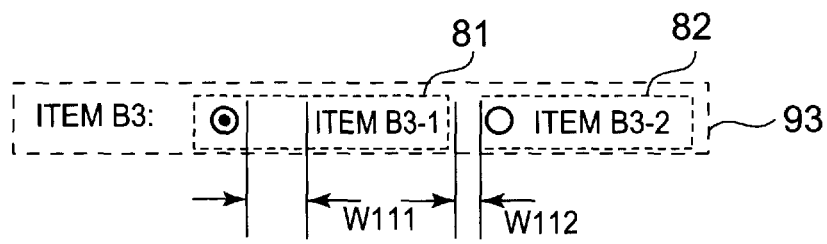
FIG. 11 It depicts an enlarged diagram showing an enlarged input/output component group (medium).

Next, the input/output component group specifying section 4 performs processing for specifying input/output component groups (large) in the manner already described above. Upon completion of the processing, input/output component groups (large) 101 and 102 are specified as shown in FIG. 10. Note that since the X coordinate of the left edge of the input/output component group (medium) 97 does not match those of the other nearby input/output component groups (medium) 93 to 96, it is specified as an independent input/output component group (medium) that does not belong to the input/output component group (large) 102.

Next, the input/output component layout determining section 5 targets all the input/output component groups (medium) and all the input/output component groups (small) to check whether there is a group in which no item indicative of the content of an input/output component or small item exists, and if there is a group in which no item or small item exists, determines that there is a problem with the presence or absence of an item. Since no item exists in the input/output component group (medium) 91 in window B as shown in FIG. 9, the input/output component layout determining section 5 determines that there is a problem with the input/output component group (medium) 91.

The input/output component layout determining section 5 also checks whether, in each individual input/output component group (medium) belonging to one input/output component group (large), the X coordinates of the left edges of input/output component groups (small) close to respective items or input/output components close to the respective items and not belonging to any input/output component group (small) match with each other. As shown in FIG. 10, since the left edges of input/output component groups (small) located in the right direction of the items and the left edges of the input/output components match in all the input/output component groups (medium) in the input/output component group (large) 102 in window B, the input/output component layout determining section 5 determines that there is no problem with the alignment of input/output components. Note that since there is only one input/output component group (medium) (input/output component group (medium) 92) including an item in the input/output component group (large) 101 (see FIG. 9 and FIG. 10), the input/output component layout determining section 5 excludes the input/output component groups (medium) in the input/output component group (large) 101 from targets of evaluation of the appropriateness of alignment.

Further, the input/output component layout determining section 5 checks for a distance to one closest to an item among input/output component groups (small) close to the item or input/output components close to the item and not belonging to any input/output component group (small) in each individual input/output component group (medium) belonging to one input/output component group (large). In window B, as shown in FIG. 10, since distance (W1) corresponding to the input/output component group (medium) 92 in the input/output component group (large) 101 does not fall within the specified range (not less than three pixels and not more than ten pixels) (see FIG. 9 and FIG. 10), the input/output component layout determining section 5 determines that there is a problem. On the other hand, in the input/output component group (large) 102, distance (W101) corresponding to the input/output component groups (medium) 95 and 97 is the closest distance, and since W101 falls within the specified range (not less than three pixels and not more than ten pixels), it is determined that there is no problem (see FIG. 9 and FIG. 10). Note that even if distance (W102) corresponding to the other input/output component groups (medium) 93 and 94 belonging to the same input/output component group (large) 102 is ten pixels or more, the input/output component layout determining section 5 does not regard it as having a problem.

Further, the input/output component layout determining section 5 checks for a distance between an item and an input/output component group (small) close to the item or an input/output component close to the item and not belonging to any input/output component group (small) in an input/output component group (medium) that does not belong to any input/output component group (large), and checks whether the distance falls within the specified range to determine whether there is a problem with the alignment of input/output components. When another input/output component exists in the left direction of the input/output component group (medium), it is checked whether the distance to the input/output component falls within the specified range to determine whether there is a problem with the alignment of input/output components. In window B, as shown in FIG. 10, since the distance between the item and the text box in the input/output component group (medium) 97 that does not belong to any input/output component group (large) is not too short and not too long, the input/output component layout determining section 5 determines that there is no problem. Further, since distance W103 to the text box arranged on the left side of the input/output component group (medium) 97 falls within the specified range, it is determined that there is no problem. In the exemplary embodiment, the "specified range" used in determining the distance between an input/output component group (medium) and an input/output component arranged on the left side is set to five pixels or more. However, any other numeric value such as not less than ten pixel and not more than 20 pixels may be set, or it may also be set such as not less than once and not more than three times the height with reference to the size (height) of the text.

Further, the input/output component layout determining section 5 targets an input/output component group (medium) including the check box or the radio button to compare the distance between a component in an input/output component group (small) and a small item with a distance to an adjacent input/output component group (small) in order to determine whether there is a problem with the interval between input/output components. As shown in an enlarged diagram of FIG. 11, where the input/output component group (medium) 93 in window B is enlarged, when distance W111 between the radio button of the input/output component group (small) 81 and the text "item B3-1" in the input/output component group (medium) 93 is compared with distance W112 to an adjacent input/output component group (small), since W112 is equal to or less than W111, the input/output component layout determining section 5 determines that there is a problem.

FIG. 12 is an explanatory drawing showing an example of output of the determination results on window B from the input/output component layout determining section 5. As shown in FIG. 12, three kinds of determination results on the presence or absence of an item, the interval of input/output components and the alignment of input/output components are output. Note that numeric values of "Item No." written in FIG. 12 denote how many display elements (text display portions such as items and input/output components) precede before the item in the lateral direction from the upper left in window B. The evaluator can easily grasp the presence or absence of a problem and the problematic portion in window B from the determination results output from the input/output component layout determining section 5 as shown in FIG. 12.

In this example, elements close to each other are also put together in the same group according to the processing methods respectively corresponding to the check box or the radio button and the text box (or the list box or combo box), enabling an evaluation on condition that portions in which the presence or absence of an item and the interval and alignment between elements are to be evaluated are specified with certainty. Further, in a group including the check box or the radio button, the distance between a corresponding component and a small item is compared with a distance to another group opposed to the check box or the radio button to determine that there is a problem when the latter is shorter than the former or determine whether the interval between one group and another group or an component is too narrow or too wide, enabling an appropriate evaluation on the layout of elements even on a complicated screen including more information.

Here, the example in which the evaluation on a selection component and the evaluation on a component relating to text are conducted is shown, but either the evaluation on a selection component or the evaluation on a component relating to text may be conducted.

Further, the input/output component group specifying section 4 specifies small groups, medium groups and large groups on an evaluation target screen, but the appropriateness of the layout and alignment of input/output information can be evaluated even when the input/output component group specifying section 4 specifies small groups and medium groups without specifying any large group.

Figure 13:
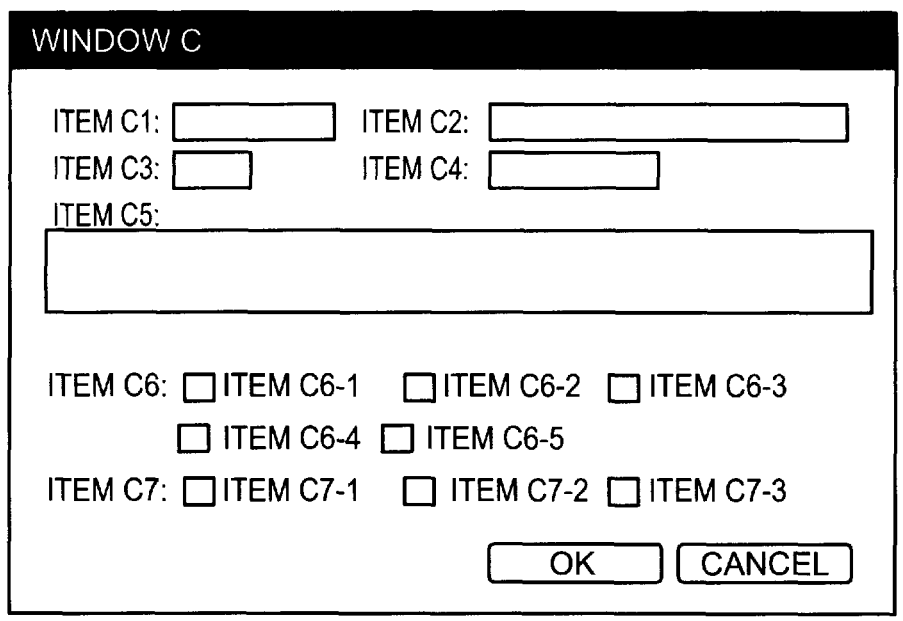
FIG. 13 It depicts an explanatory drawing showing window C as the evaluation target screen.

Referring next to explanatory drawings of FIG. 13 to FIG. 16, still another example of processing performed by the input/output component group specifying section 4 and the input/output component layout determining section 5 to specify input/output component groups on an evaluation target screen and determine the appropriateness of the layout of input/output information will be described. FIG. 13 is an explanatory drawing showing window C as the evaluation target screen. Here, a case is taken as an example in which window C shown in FIG. 13 is targeted for evaluation.

Figure 14:
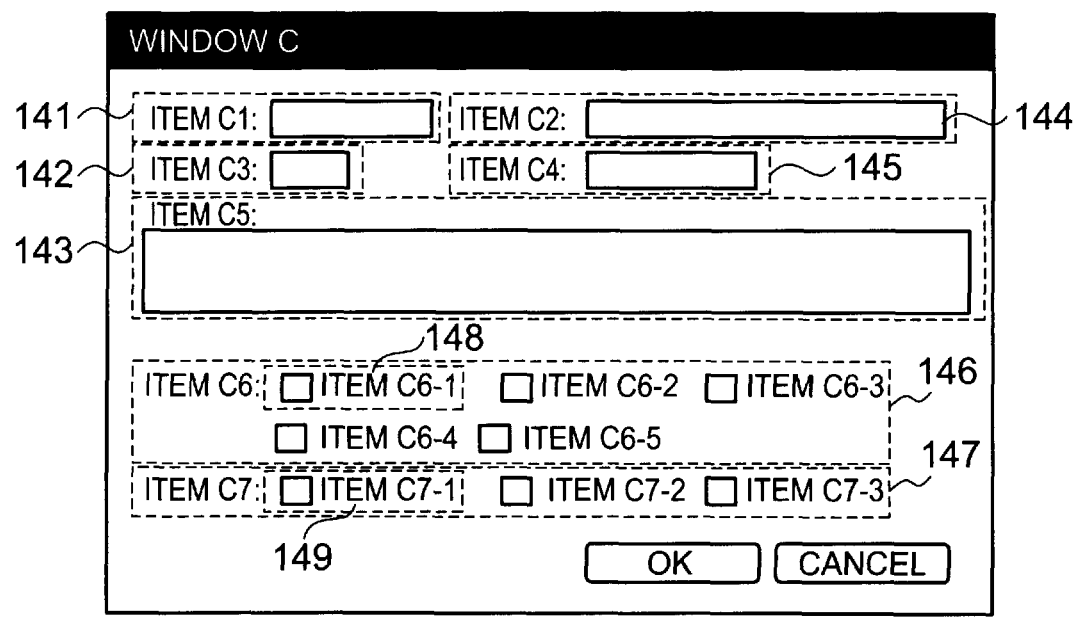
FIG. 14 It depicts an explanatory drawing showing the specification results of input/output component groups (small) and input/output component groups (medium).

The input/output component group specifying section 4 performs processing for specifying input/output component groups (small) and input/output component groups (medium) in the manner already described above. Upon completion of the processing, input/output component groups (medium) 141 to 147 are specified as shown in FIG. 14. In regard to an input/output component group (small) 148 and an input/output component group (small) 149, a group in which text "item C6:" located on the left of the input/output component group (small) 148 is regarded as an item and a group in which text "item C7:" located on the left of the input/output component group (small) 149 is regarded as an item are set as different groups, and input/output component groups (small) that falls within the specified distance in the right direction and the downward direction of each group are put together and regarded as belonging to the input/output component group (medium) 146 and the input/output component group (medium) 147, respectively.

Figure 15:
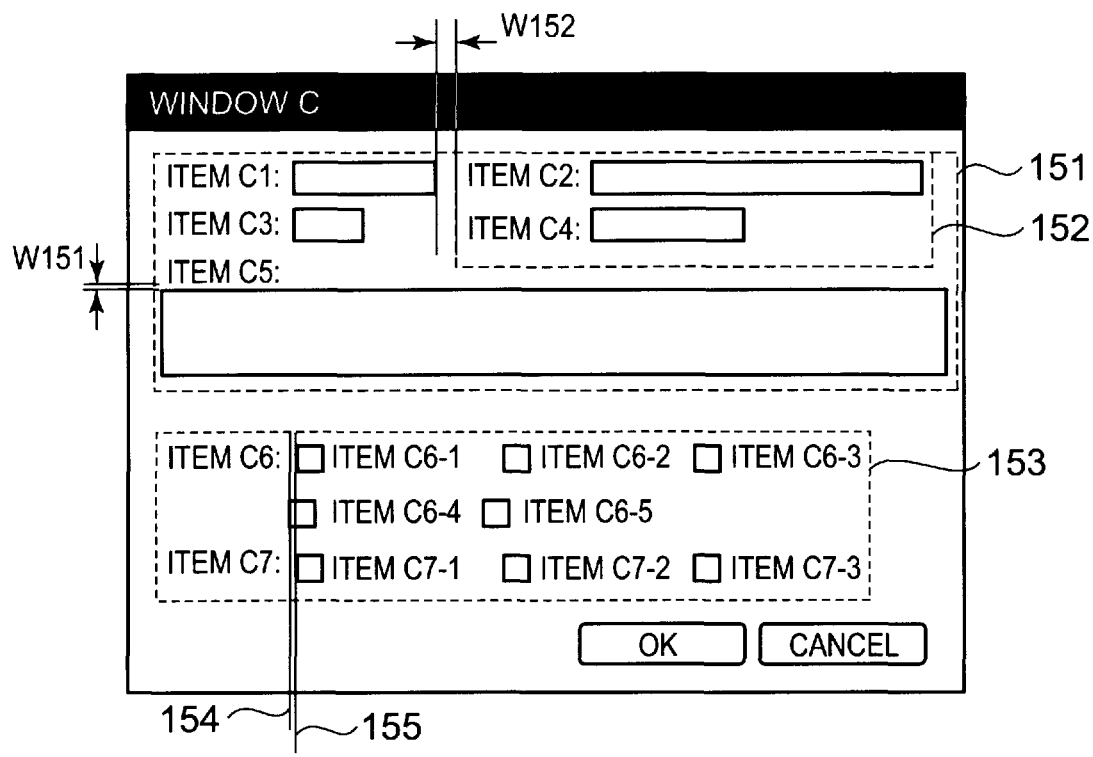
FIG. 15 It depicts an explanatory drawing showing the specification results of input/output component groups (large).

Next, the input/output component group specifying section 4 perform processing for specifying input/output component groups (large) in the manner already described above. Upon completion of the processing, input/output component groups (large) 151 to 153 are specified as shown in FIG. 15.

Next, the input/output component layout determining section 5 targets all the input/output component groups (medium) and all the input/output component groups (small) to check whether there is a group in which no item indicative of the content of an input/output component or small item exists. If there is a group in which no item or small item exists, it is determined that there is a problem with the presence or absence of an item. Since items or small items are included in all the groups in window C, the input/output component layout determining section 5 determines that there is no problem.

The input/output component layout determining section 5 also checks whether, in each individual input/output component group (medium) belonging to one input/output component group (large), the X coordinates of the left edges of input/output component groups (small) close to respective items or input/output components close to the respective items and not belonging to any input/output component group (small) match with each other. In window C, an input/output component group (medium) 143 in the input/output component group (large) 151 is such that the item is located in the upward direction of the input/output component (see FIG. 14 and FIG. 15). Therefore, the input/output component group (medium) 143 is excluded from targets. Since the X coordinates of the left edges of input/output components in the other input/output component groups (medium) 141 and 142 match with each other, the input/output component layout determining section 5 determines that there is no problem with the alignment of input/output components. Further, in the input/output component group (large) 153, since the left edges of the input/output component groups (small) vary (see auxiliary lines 154 and 155 in FIG. 15), it is determined that there is a problem with the alignment of the input/output components. Thus, the input/output component layout determining section 5 compares the positions of placing the same-level groups included in a large group (the level of which is the small level in this example, but it may be the medium level) to evaluate the appropriateness of the layout between elements.

Further, the input/output component layout determining section 5 checks for a distance between an item and one closest to the item among input/output component groups (small) close to the item or input/output components close to the item and not belonging to any input/output component group (small) in each individual input/output component group (medium) belonging to one input/output component group (large). In window C, it is determined that there is no problem with the interval in all the input/output component groups (medium) 141, 142 and 144 to 147 in each of which the item and the input/output component are arranged in the lateral direction. In regard to the input/output component group (medium) 143 in which the item and the input/output component are arranged in the vertical direction, the input/output component layout determining section 5 checks for distance (W151) between the item and the input/output component regardless of whether it belongs to an input/output component group (large) or not. In this case, as shown in FIG. 15, since it does not fall within the specified range (since it is too narrow), the input/output component layout determining section 5 determines that there is a problem.

Further, the input/output component layout determining section 5 checks whether, when another input/output component exists in the left direction of an input/output component group (large), a distance to the other input/output component falls within the specified range to determine whether there is a problem with the alignment of input/output components. In window C, as shown in FIG. 15, since distance W152 to the text box arranged on the left in the input/output component group (large) 152 falls within the specified range, the input/output component layout determining section 5 determines that there is no problem.

FIG. 16 is an explanatory drawing showing an example of output of the determination results on window C from the input/output component layout determining section 5. As shown in FIG. 16, three kinds of determination results on the presence or absence of an item, the interval of input/output components and the alignment of input/output components are output. Note that numeric values of "Item No." written in FIG. 16 denote how many display elements (text display portions such as items and input/output components) precede before the item in the lateral direction from the upper left in window B. For example, "check box (item No. 12)" denotes a check box corresponding to the twelfth check box, i.e., "item C6-1," obtained by counting elements from the upper left in the lateral direction, and when reaching the left end, counting elements from the left end therebeneath. The evaluator can easily grasp the presence or absence of a problem and the problematic portion in window C from the determination results output from the input/output component layout determining section 5 as shown in FIG. 16.

In this example, elements close to each other are also put together in the same group according to the processing methods respectively corresponding to the check box or the radio button and the text box (or the list box or combo box), enabling an evaluation on condition that portions in which the presence or absence of an item, and the interval and alignment between elements are to be evaluated are specified with certainty. Further, the determination on an item and an input/output component is made by taking into account groups having a vertical layout to enable an appropriate evaluation on the layout of elements even on a complicated screen.

Here, the example in which the evaluation on a selection component and the evaluation on a component relating to text are conducted is shown, but either the evaluation on a selection component or the evaluation on a component relating to text may be conducted.

Further, the input/output component group specifying section 4 specifies small groups, medium groups and large groups on an evaluation target screen, but the appropriateness of the layout and alignment of input/output information can be evaluated even when the input/output component group specifying section 4 specifies small groups and medium groups without specifying any large group.

As described above, the GUI evaluation system of the exemplary embodiment groups elements on an evaluation target screen based on generally used GUI patterns such as characteristics on types of input/output components, symbols and units so that the interval between elements, the appropriateness of alignment and the presence or absence of an item in each group, and the interval of elements, the appropriateness of alignment and the presence or absence of an item between groups can be determined.

The evaluator can certainly determine the interval of each element (or component), the appropriateness of alignment and the presence or absence of an item in terms of a bunch (group) of multiple elements, rather than evaluating each element on an evaluation target screen individually, and hence can check for a problematic portion with certainty.

Figure 17:
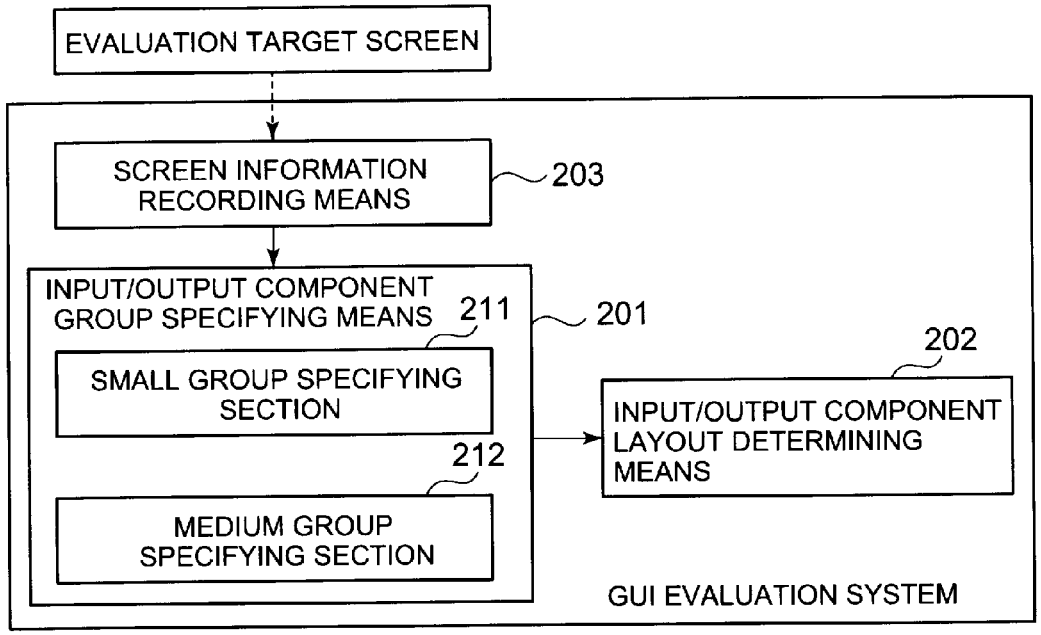
FIG. 17 It depicts a block diagram showing main sections of the GUI evaluation system according to the present invention.

FIG. 17 is a block diagram showing main sections of the GUI evaluation system according to the present invention. As shown in FIG. 17, the GUI evaluation system includes a screen information recording means 203 (corresponding to the GUI information recording section 2 shown in FIG. 1) for storing, as screen information, information on text and input/output components as elements on an evaluation target screen, an input/output component group specifying means 201 (corresponding to the input/output component group specifying section 4 shown in FIG. 1) for specifying a group of elements, wherein the input/output component group specifying means 201 includes a small group specifying section 211 for referring to the screen information stored in the screen information recording means 203 to specify, as a small group, a set containing an input/output component and an element close to the input/output component as members, and a medium group specifying section 212 for specifying, as a medium group, a set containing a small group and another small group close to the small group or text or another small group and text as members, and input/output component layout determining section 202 (corresponding to the input/output component layout determining section 5 shown in FIG. 1) for evaluating the layout of elements based on the relationship between elements in a group specified by the input/output component group specifying section and the relationship between groups.

Figure 18:
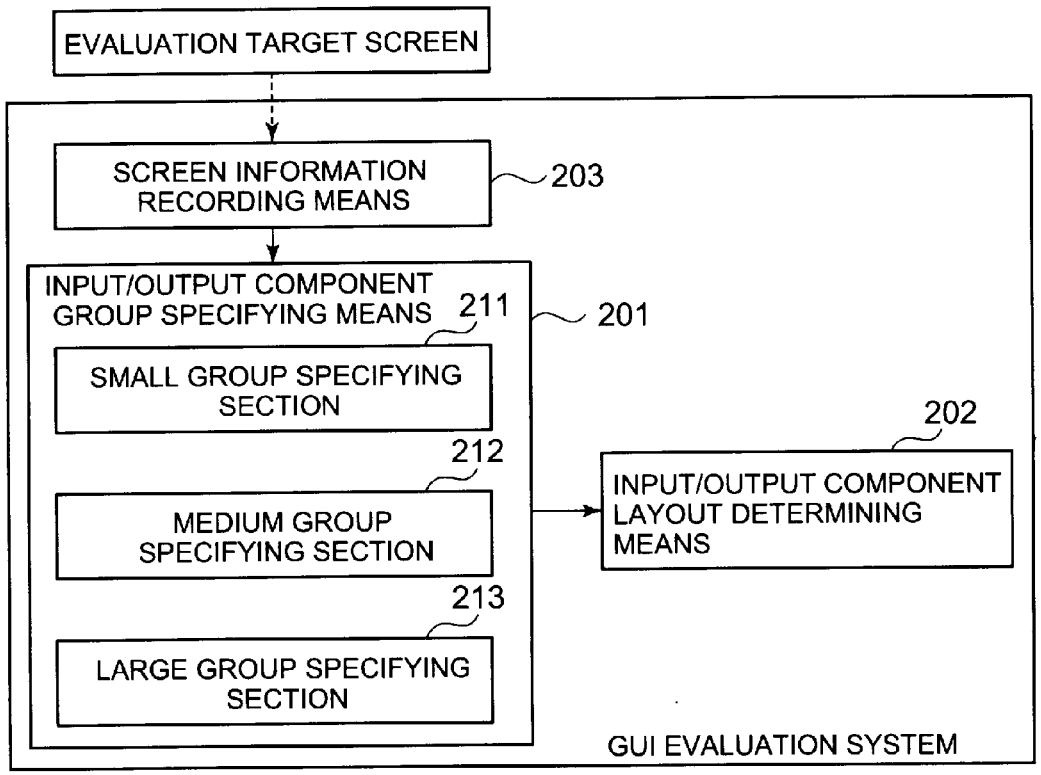
FIG. 18 It depicts a block diagram showing main sections of another aspect of the GUI evaluation system according to the present invention.

Further, as shown in FIG. 18, the GUI evaluation system may such that the input/output component group specifying means 201 further includes a large group specifying section 213 for specifying, as a large group, a set containing a medium group and another medium group close to the medium group as members.

Figure 19:
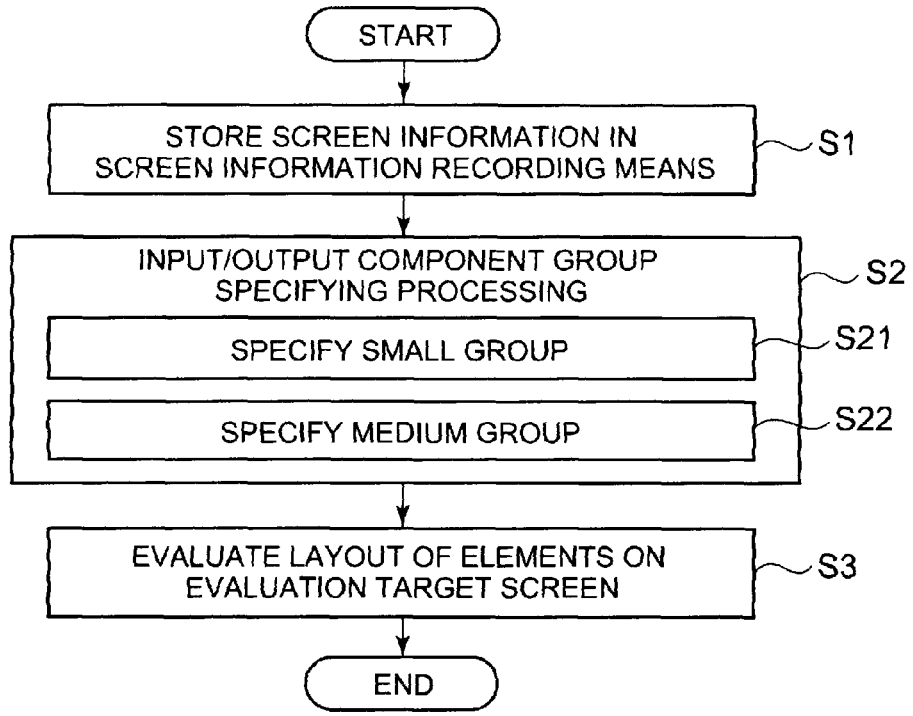
FIG. 19 It depicts a flowchart showing an outline of a GUI evaluation method according to the present invention.

FIG. 19 is a flowchart showing an outline of a GUI evaluation method according to the present invention. It is assumed that the GUI evaluation method is performed in the GUI evaluation system shown in FIG. 17. As shown in FIG. 19, information on text and input/output components as elements on an evaluation target screen is prestored as screen information in the screen information recording means (step S1). Then, input/output component group specifying processing is performed to specify a group of elements (step S2).

In the processing of step S2, the screen information stored in the screen information recording means is referred to specify, as a small group, a set containing an input/output component and an element close to the input/output component as members (step S21), and as a medium group, a set containing a small group and another small group or text close to the small group or the other small group and text as members (step S22).

After that, the layout of elements is evaluated based on the relationship between elements in a group specified in the processing of step S2 and the relationship between groups (step S3).

Figure 20:
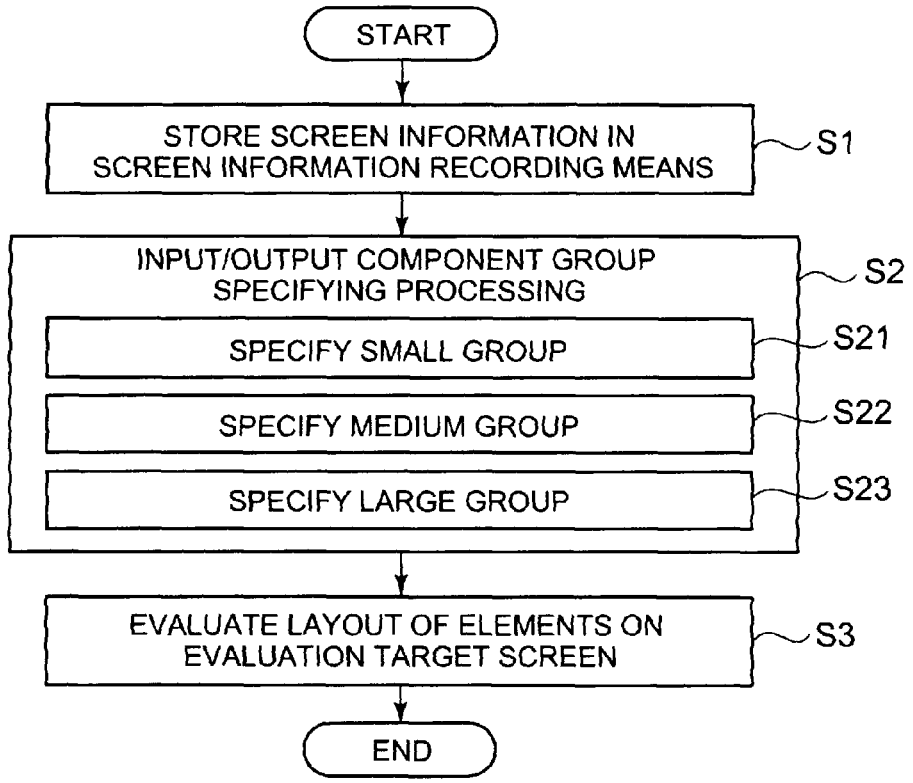
FIG. 20 It depicts a flowchart showing an outline of another aspect of the GUI evaluation method according to the present invention.

Further, as shown in FIG. 20, the GUI evaluation method may be such that processing for specifying, as a large group, a set containing a medium group and another medium group close to the medium group as members (step S23) is further performed.

While the invention is described with reference to the exemplary embodiment and examples, the invention is not intended to be limited to the exemplary embodiment and examples. Various changes that will be appreciated by those skilled in the art can be made to the configuration and details of the invention within the scope of the invention.

This application claims priority based upon Japanese Patent Application No. 2008-251811 filed Sep. 29, 2008, which is incorporated by reference herein in its entirety.

INDUSTRIAL APPLICABILITY

The present invention is preferably applicable to applications for evaluating system usability.

REFERENCE SIGNS LIST

1 Input/Output Means
2 GUI Information Recording Section
3 GUI Information Acquiring Section
4 Input/Output Component Group Specifying Section
5 Input/Output Component Layout Determining Section
6 Evaluation Target System
31, 32 Radio Button
33 Text Box
41 to 43 Input/Output Component Group (Small)
51 to 56 Input/Output Component Group (Medium)
61, 62 Input/Output Component Group (Large)
63, 64 Auxiliary Line
81 to 83 Input/Output Component Group (Small)
91 to 97 Input/Output Component Group (Medium)
101, 102 Input/Output Component Group (Large)
141 to 147 Input/Output Component Group (Medium)
151 to 153 Input/Output Component Group (Large)
154, 155 Auxiliary Line
201 Input/Output Component Group Specifying Means
202 Input/Output Component Layout Determining Section
203 Screen Information Recording Means
211 Small Group Specifying Section
212 Medium Group Specifying Section
213 Large Group Specifying Section

The invention claimed is:

1. A GUI evaluation system for evaluating an evaluation target screen included in the evaluation system, comprising:
a hardware storage medium providing a screen information recording section which stores, as screen information, information on text and input/output components as elements on the evaluation target screen; and
an input/output component group specifying section which specifies a group of elements, the input/output component group specifying section implemented by a Computer Processing Unit operating according to a program on a computer that realizes the GUI evaluation system;
wherein the input/output component group specifying section includes
a small group specifying section for referring to the screen information stored in the screen information recording section to specify a small group, the small group specification being based on a set of i) an input/output component and ii) an element close to the input/output component, and
a medium group specifying section for specifying a medium group, the medium group specification being based on a) a small group which is specified by the small group specifying section, and b) one of the group consisting of i) another small group, ii) text close to the small group, and iii) the other small group and the text; and
an input/output component layout determining section which evaluates appropriateness of a layout of elements and input/output components in the small group included in the medium group based on a presence or an absence of elements in the medium group specified by the input/output component group specifying section and a relationship between the position of an input/output component and the position of an element close to the input/output component, the input/output component layout determining section implemented by the Computer Processing Unit operating according to the program on the computer that realizes the GUI evaluation system,
wherein the input/output component layout determining section determines whether text display corresponding to the input/output component is included in respective medium groups and respective small groups.

2. The GUI evaluation system according to claim 1, wherein the input/output component layout determining section targets the respective medium groups and the respective small groups to determine whether text display is included in order to evaluate appropriateness on the presence or the absence of an item corresponding to an input/output component.

3. The GUI evaluation system according to claim 1, wherein the input/output component layout determining section determines whether a distance between text display in a medium group and a small group or an input/output component in a group adjacent to the text display falls within a certain specified range to evaluate the appropriateness of the layout of elements.

4. The GUI evaluation system according to claim 1, wherein when the input/output component is a selection component, the input/output component layout determining section compares the distance between the input/output component and the text display with a distance between the input/output component and an adjacent input/output component, and when the distance between the input/output component and the text display is equal to or less than the distance between the input/output component and the adjacent input/output component, determines that the layout of the selection component is inappropriate.

5. The GUI evaluation system according to claim 1, wherein the input/output component group specifying section further includes a large group specifying section for specifying a large group, the large group specification being based on a set of i) a medium group and ii) another medium group close to the medium group, and the input/output component layout determining section determines a variation in arrangement of a small group or an input/output component close to the text display in a medium group included in a large group to evaluate appropriateness of alignment of input/output components.

6. The GUI evaluation system according to claim 5, wherein the input/output component layout determining section evaluates the appropriateness of a layout between elements according to a distance between a large group and an input/output component close to the large group.

7. The GUI evaluation system according to claim 5, wherein the input/output component layout determining section compares positions of placing same-level groups included in a large group to evaluate the appropriateness of the layout between elements.

8. A GUI evaluation method for evaluating an evaluation target screen included in the evaluation system, comprising:
storing, as screen information in a screen information recording section, information on text and input/output components as elements on the evaluation target screen;
specifying a group of elements, and
in specifying the group of elements,
referring to the screen information stored in the screen information recording section to specify a small group, the small group specification being based on a set of i) an input/output component and ii) an element close to the input/output component, and
specifying a medium group, the medium group specification being based on a set of a small group which is specified by the small group, and one of the group consisting of i) another small group, ii) text close to the small group, iii) the other small group and the text; and
evaluating appropriateness of a layout of elements and input/output components in the small group included in the medium group based on a presence or an absence of elements in the medium group containing the specified element and a relationship between the position of an input/output component and the position of an element close to the input/output component,
wherein upon evaluating the layout of elements, determining whether text display corresponding to the input/output component is included in respective medium groups and respective small groups.

9. The GUI evaluation method according to claim 8, wherein upon evaluating the layout of elements, targeting the respective medium groups and the respective small groups to determine whether text display is included in order to evaluate appropriateness on the presence or the absence of an item corresponding to an input/output component.

10. The GUI evaluation method according to claim 8, wherein upon evaluating the layout of elements, it is determined whether a distance between text display in a medium group and a small group or an input/output component in a group adjacent to the text display falls within a certain specified range to evaluate the appropriateness of the layout of elements.

11. The GUI evaluation method according to claim 8, wherein upon evaluating the layout of elements, when the input/output component is a selection component, the distance between the input/output component and the text display is compared with a distance between the input/output component and an adjacent input/output component, and when the distance between the input/output component and the text display is equal to or less than the distance between the input/output component and the adjacent input/output component, it is determined that the layout of the selection component is inappropriate.

12. The GUI evaluation method according to claim 8, wherein upon evaluating the layout of elements, a large group specifying processing for specifying a large group, the large group specification being based on a set of i) a medium group and ii) another medium group close to the medium group is included, and
a variation in arrangement of a small group or an input/output component close to the text display in a medium group included in a large group is determined in the input/output component layout determining processing to perform alignment evaluation processing for evaluating appropriateness of alignment of input/output components.

13. The GUI evaluation method according to claim 12, wherein in the input/output component layout determining processing, layout evaluation processing for evaluating the appropriateness of the layout between elements according to a distance between a large group and an input/output component close to the large group.

14. The GUI evaluation method according to claim 12, wherein in the input/output component layout determining processing, layout evaluation processing for comparing positions of placing same-level groups included in a large group to evaluate the appropriateness of the layout between elements is performed.

15. A non-transitory computer-readable storage medium storing a GUI evaluation program, when executed, making a computer in a GUI evaluation system, which evaluates an evaluation target screen included in the evaluation system, perform:
screen information storing processing for storing, as screen information in a screen information recording section, information on text and input/output components as elements on the evaluation target screen;
input/output component group specifying processing for specifying a group of elements,
wherein in the input/output component group specifying processing, the computer is caused to perform
small group specifying processing for referring to the screen information stored in the screen information recording section to specify a small group, the small group specification being based on i) a set of an input/output component and ii) an element close to the input/output component, and
medium group specifying processing for specifying a medium group, the medium group specification being based on a set of a small group which is specified by the small group specifying processing and one of the group consisting of i) another small group, ii) text close to the small group, and iii) the other small group and the text; and
input/output component layout determining processing for evaluating appropriateness of a layout of elements and input/output components in the small group included in the medium group based on a presence or an absence of elements in the medium group specified in the input/output component group specifying processing and a relationship between the position of an input/output component and the position of an element close to the input/output component,
wherein in the input/output component layout determining processing, making the computer perform a determination of whether text display corresponding to the input/ output component is included in respective medium groups and respective small groups.

16. The non-transitory computer-readable storage medium storing the GUI evaluation program according to claim 15, wherein in the input/output component layout determining processing, making the computer perform:
item evaluation processing for targeting the respective medium groups and the respective small groups to determine whether text display is included in order to evaluate appropriateness on the presence or the absence of an item corresponding to an input/output component.

17. The non-transitory computer-readable storage medium storing the GUI evaluation program according to claim 15, wherein in the input/output component layout determining processing, making the computer perform:
layout evaluation processing for determining whether a distance between text display in a medium group and a small group or an input/output component in a group adjacent to the text display falls within a certain specified range to evaluate the appropriateness of a layout between elements.

18. The non-transitory computer-readable storage medium storing the GUI evaluation program according to claim 15, wherein in the input/output component layout determining processing, when the input/output component is a selection component, making the computer perform:
layout evaluation processing for comparing the distance between the input/output component and the text display with a distance between the input/output component and an adjacent input/output component, and when the distance between the input/output component and the text display is equal to or less than the distance between the input/output component and the adjacent input/output component, determining that the layout of the selection component is inappropriate.

19. The non-transitory computer-readable storage medium storing the GUI evaluation program according to claim 15, wherein in the input/output component group specifying processing, making the computer perform:
large group specifying processing for specifying a large group, the large group specification being based on a set of i) a medium group and ii) another medium group close to the medium group; and
alignment evaluation processing for determining a variation in arrangement of a small group or an input/output component close to the text display in a medium group included in a large group in the input/output component layout determining processing to evaluate appropriateness of alignment of input/output components.

20. The non-transitory computer-readable storage medium storing the GUI evaluation program according to claim 19, wherein in the input/output component layout determining processing, making the computer perform:
layout evaluation processing for evaluating the appropriateness of a layout between elements according to a distance between a large group and an input/output component close to the large group.

21. The non-transitory computer-readable storage medium storing the GUI evaluation program according to claim 19, wherein in the input/output component layout determining processing, making the computer perform:
layout evaluation processing for comparing positions of placing same-level groups included in a large group to evaluate the appropriateness of the layout between elements.

* * * * *